(12) United States Patent
Jeong et al.

(10) Patent No.: US 9,270,197 B2
(45) Date of Patent: Feb. 23, 2016

(54) POWER FACTOR CORRECTION APPARATUS AND METHOD FOR CORRECTING POWER FACTOR USING THE SAME

(71) Applicant: Samsung Electro-Mechanics Co., Ltd., Suwon, Gyunggi-do (KR)

(72) Inventors: In Wha Jeong, Suwon (KR); Bum Seok Suh, Suwon (KR); Kwang Soo Kim, Suwon (KR)

(73) Assignee: SAMSUNG ELECTRO-MECHANICS CO., LTD., Suwon, Gyunggi-Do (KR)

( * ) Notice: Subject to any disclaimer, the term of this patent is extended or adjusted under 35 U.S.C. 154(b) by 370 days.

(21) Appl. No.: 13/862,131

(22) Filed: Apr. 12, 2013

(65) Prior Publication Data

US 2014/0152271 A1 Jun. 5, 2014

(30) Foreign Application Priority Data

Dec. 5, 2012 (KR) .......................... 10-2012-0140173

(51) Int. Cl.
*H02M 7/06* (2006.01)
*H02M 1/42* (2007.01)
*H02M 3/158* (2006.01)

(52) U.S. Cl.
CPC ............ *H02M 7/066* (2013.01); *H02M 1/4225* (2013.01); *H02M 3/158* (2013.01); *H02M 3/1584* (2013.01); *Y02B 70/126* (2013.01)

(58) Field of Classification Search
CPC .... H02M 7/066; H02M 1/4225; H02M 3/158
USPC .................................................. 363/89, 126
See application file for complete search history.

(56) References Cited

U.S. PATENT DOCUMENTS

| 2008/0204098 A1* | 8/2008 | Qahouq | H02M 3/1584 327/175 |
| 2009/0122582 A1* | 5/2009 | Ye | H02M 1/4233 363/89 |
| 2012/0250363 A1* | 10/2012 | Skinner | H02M 3/1584 363/21.12 |
| 2013/0194848 A1* | 8/2013 | Bernardinis et al. | 363/126 |

FOREIGN PATENT DOCUMENTS

| KR | 10-2007-0116240 A | 12/2007 |
| KR | 2009-0058246 A | 6/2009 |
| WO | 2006/105247 A2 | 10/2006 |

OTHER PUBLICATIONS

Notice of Office Action Korean Patent Application No. 10-2012-0140173 dated Nov. 28, 2013 with English translation.

* cited by examiner

*Primary Examiner* — Jue Zhang
(74) *Attorney, Agent, or Firm* — McDermott Will & Emery LLP

(57) ABSTRACT

There are provided a power factor correction device and a method for controlling power factor correction using the same. The power factor correction device includes a power factor correction circuit and a control circuit. The power factor correction circuit includes first and second inductors connected to an input power source stage and first and second main switches performing a switching operation on the first and second inductors, respectively. The control circuit may provide control signals to the first and second main switches, respectively, and when phase currents flowing in the respective first and second inductors are unbalanced, the control circuit may change a phase of at least one of the first and second main switches to correct an imbalance of the phases.

9 Claims, 7 Drawing Sheets

POWER FACTOR CORRECTION APPARATUS AND METHOD FOR CORRECTING POWER FACTOR USING THE SAME

CROSS-REFERENCE TO RELATED APPLICATIONS

This application claims the priority of Korean Patent Application No. 10-2012-0140173 filed on Dec. 5, 2012, in the Korean Intellectual Property Office, the disclosure of which is incorporated herein by reference.

BACKGROUND OF THE INVENTION

1. Field of the Invention

The present invention relates to a power factor correction apparatus capable of correcting a power factor of a power source device, and a method for controlling a power factor using the same.

2. Description of the Related Art

Recently, national governments around the world have urged the effective use of energy in conformity with energy efficiency policies, and in particular, effective use of energy in electronic products or home appliances is widely recommended.

Thus, according to such recommendations, a remedial circuit for effectively using energy has been applied to power supply devices supplying power to electronic products, home appliances, and the like.

The remedial circuit may be, for example, a power factor correction circuit. A power factor correction circuit is a circuit for switching input power to adjust a phase difference (power factor) between a current and a voltage of the input power to effectively transfer power to a rear stage.

Among power factor correction circuits, a boost power factor correction circuit has been generally used, but it have relatively low efficiency, a high internal current, voltage ripples, electromagnetic interference (EMI) noise, and the like, and thus, so its application to a middle or large-scale power source device is not easy.

In order to solve these problems, in case of a related art interleaved boost power factor correction (PFC) circuit configured by connecting boost PFC circuits in parallel, the respective boost PFCs connected in parallel are equally operated with a time difference during a switching period with respect to overall output power, to thereby simultaneously reduce ripples of an input current and those of an output voltage. Accordingly, a size of an input EMI filter can be reduced.

However, the interleaved boost PFC circuit has a limitation in that degradation of a power factor due to a phase difference between inductors connected in parallel cannot be compensated. In other words, a phase difference between inductors cannot be compensated.

The related art mentioned below relates to a power factor correction circuit, which, however, has the foregoing limitations.

RELATED ART DOCUMENT (Patent document 1) Korean Patent Laid Open Publication No. 2009-0058246

SUMMARY OF THE INVENTION

An aspect of the present invention provides a power factor correction device in which imbalances of phases of inductors are detected, and the phase currents of the respective inductors are individually controlled to thus compensate for the imbalance of the phases of the inductors, and a method for controlling power factor correction using the same.

According to an aspect of the present invention, there is provided a power factor correction device. The power factor correction device includes a power factor correction circuit and a control circuit. The power factor correction circuit includes first and second inductors connected to an input power source stage and first and second main switches performing a switching operation on the first and second inductors, respectively. The control circuit may provide control signals to the first and second main switches, respectively, and when the phase currents flowing in the respective first and second conductors are unbalanced, the control circuit may change a phase of at least one of the first and second main switches to correct an imbalance of the phases.

The control circuit may include: an imbalance detection unit detecting whether the phase currents of the first and second inductors are unbalanced; and a compensation signal generation unit generating a control signal by delaying a phase of at least one of the first and second main switches to make the phase currents of the first and second inductors balanced, when the phases are unbalanced.

The control circuit may further include: a control signal generation unit generating the control signal to have a pre-set phase difference when the phases are not unbalanced.

When a phase difference between the currents of the first and second inductors is 180 degrees, the control circuit may determine that the phases of the first and second inductors are not unbalanced.

The power factor correction circuit may include: first and second inductors having one ends connected to the input power source stage and the other ends connected to a load stage, the first and second inductors being connected to each other in parallel; and first and second main switches switching the first and second inductors to have a phase difference, according to the control signal provided by the control circuit.

The first and second inductors may accumulate or discharge power provided by the input power source stage according to switching operations of the first and second main switches, respectively.

The power factor correction circuit may further include first and second auxiliary switches forming a transmission path for surplus power existing in the circuit before the first and second main switches are turned on.

The power factor correction circuit may further include first and second auxiliary inductors connected to the first and second auxiliary switches and accumulating or discharging the surplus power according to a switching operation of the first and second auxiliary switches.

The first and second auxiliary switches may perform a switching operation in advance before the first and second main switches perform a switching operation, and complete the switching operation after the turn-on switching of the first and second main switches is completed, respectively.

The power factor correction circuit may further include: first and second reverse current preventing diodes connected in parallel to the first and second main switches and preventing reverse currents in the first and second main switches, respectively.

The power factor correction circuit may further include: a first diode providing a transmission path for power discharged from the first inductor according to a switching operation of the first main switch; and a second diode providing a transmission path for power discharged from the second inductor according to a switching operation of the second main switch.

According to another aspect of the present invention, there is provided a method for controlling power factor correction. The method for controlling power factor correction is performed by a control circuit controlling a power factor correction circuit including first and second inductors connected in parallel and first and second main switches performing switching operation on the first and second inductors. The method for controlling power factor correction may include: comparing phase currents flowing in the first and second inductors to determine whether the phases are unbalanced; and when the phases are unbalanced, delaying a phase of any one of the first and second main switches such that the phase currents of the first and second inductors are balanced.

The determining of whether the phases are unbalanced may include: when the difference of the phase currents of the first and second inductors is within certain range, determining that the phases are not unbalanced.

The delaying of a phase may include: when the difference of the phase currents of the first and second inductors is above certain range, delaying a phase of any one of the currents of the first and second inductors to compensate the difference of the phase currents.

The method may further include: when the phases are not unbalanced, providing a control signal having a pre-set phase difference applied in a balanced state.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
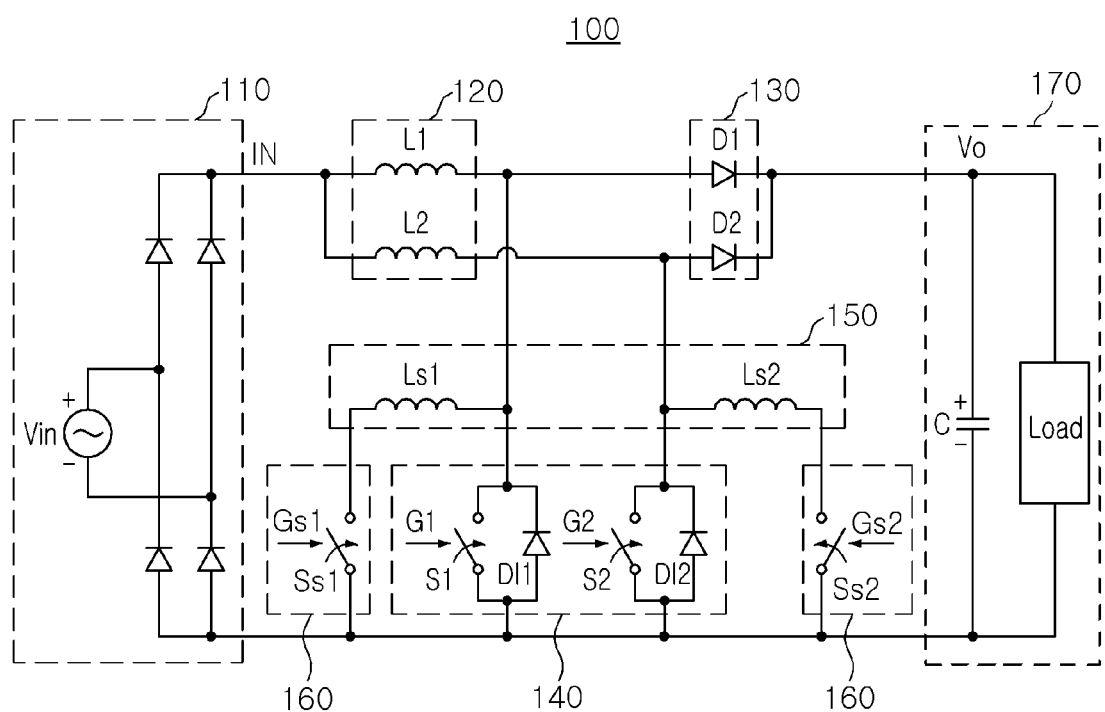
FIG. 1 is a schematic circuit diagram of a power factor correction circuit according to an embodiment of the present invention.

Hereinafter, embodiments of the present invention will be described in detail with reference to the accompanying drawings.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

While terms such as "first" and "second," etc., may be used to describe various members, components, regions, layers, and/or parts, such components must not be understood as being limited to the above terms. The above terms are used only to distinguish one component from another. Thus, a first member, component, region, layer, or part may be referred to as a second member, component, region, layer, or part without departing from the scope of rights of the present invention.

It will be understood that when an element is referred to as being "connected to" another element, it can be directly connected to the other element or intervening elements may also be present. In contrast, when an element is referred to as being "directly connected to" another element, no intervening elements are present. In addition, unless explicitly described to the contrary, the word "comprise" and variations such as "comprises" or "comprising," will be understood to imply the inclusion of stated elements but not the exclusion of any other elements.

In the drawings, the shapes and dimensions of elements may be exaggerated for clarity, and the same reference numerals will be used throughout to designate the same or like components.

FIG. 1 is a schematic circuit diagram of a power factor correction circuit according to an embodiment of the present invention.

Referring to FIG. 1, a power factor correction circuit 100 may include an input power source stage 110, an inductor unit 120, a diode unit 130, a main switch unit 140, an auxiliary inductor unit 150, an auxiliary switching unit 160, and a load stage 170.

The input power source stage 110 may provide an external input to the power factor correction circuit 100. According to an embodiment of the present invention, the input power source 110 may include a rectifier element.

The inductor unit 120 may be connected between the input power source stage 110 from which input power is applied and the main switch unit 140 and may accumulate or discharge power according to switching of the main switching unit 140.

In an embodiment, the inductor unit 120 is connected between the input power source stage 110 and the main switching unit 140 and accumulates or discharges power according to switching of the main switching unit 140.

In an embodiment, the inductor unit 120 may include a first inductor L1 and a second inductor L2. The first inductor L1 may be connected between the input power stage IN and a first main switch S1. The second inductor L2 may be connected between the input power stage IN and a second main switch S2. The first inductor L1 and the second inductor L2 may accumulate or discharge power according to according to switching operations of the first main switch S1 and the second main switch S2, respectively.

The diode unit 130 may provide a transmission path for power discharged from the inductor unit 120 according to a switching operation of the main switching unit 140. In detail, the diode unit 130 may include a first diode D1 and a second diode D2. The first diode D1 may provide a transmission path for power discharged from the first inductor L1 according to a switching operation of the first main switch S1. The second diode D2 may provide a transmission path for power discharged from the second inductor L2 according to a switching operation of the second main switch S2.

The main switching unit 140 may include a first main switch S1 and the second main switch S2 performing a switching operation with a predetermined phase difference in order to improve a power factor of input power.

The main switching unit 140 may include a first reverse current preventing diode DI1 and a second reverse current preventing diode DI2. The first reverse current preventing diode DI1 may prevent a reverse current in the first main switch S1, and the second reverse current preventing diode DI2 may prevent a reverse current in the second main switch S2.

The first reverse current preventing diode DI1 and the second reverse current preventing diode DI2 may be diodes formed in a body when the first main switch S1 and the second main switch S2 are configured as transistors, but the present invention is not limited thereto and the first reverse current preventing diode DI1 and the second reverse current preventing diode DI2 may be implemented as separately added diodes.

The auxiliary inductor unit 150 may regulate an amount of current flowing in the auxiliary switching unit 160 in the event of a switching operation of the auxiliary switching unit 160. The auxiliary inductor unit 150 may include a first auxiliary inductor Ls1 and a second auxiliary inductor Ls2. The first auxiliary inductor Ls1 and the second auxiliary inductor Ls2 may be connected to a first auxiliary switch Ss1 and a second auxiliary switch Ss2, respectively, and may accumulate or discharge surplus power according to switching operations of the first auxiliary switch Ss1 and the second auxiliary switch Ss2.

The auxiliary switching unit 160 may include the first auxiliary switch Ss1 and the second auxiliary switch Ss2. The first auxiliary switch Ss1 may be connected in parallel to the first main switch S1, and the second auxiliary switch Ss2 may be connected in parallel to the second main switch S2.

Here, the even in the case that the auxiliary switching unit 160 forms a transmission path for surplus power of the main switch unit 140 to reduce switching loss of the main switch unit 140, switching loss of the auxiliary switching unit 160 may be generated.

In other words, a peak voltage according to transient power may be generated from both ends of the first auxiliary switch Sn1 to cause switching loss.

In order to solve the problem, the power factor correction device 100 may further include the auxiliary inductor unit 150 regulating an amount of current flowing in the auxiliary switching unit 160 in the event of a switching operation of the auxiliary switching unit 160. Namely, the first auxiliary inductor Ls1 may be connected to the first auxiliary switch Ss1 and the second auxiliary inductor Ls2 may be connected to the second auxiliary switch Ss2 to regulate an amount of current flowing in the event of a switching operation to compensate for switching loss.

The load stage 170 may include a capacitor C connected in parallel. The capacitor C may stabilize power output from the diode unit 130.

The first main switch S1, the second main switch S2, the first auxiliary switch Ss1, and the second auxiliary switch Ss2 may be configured as one of an insulated gate bipolar transistor (IGBT), a metal oxide semiconductor field-effect transistor (MOS-FET), and a bipolar junction transistor (BJT), respectively.

In FIG. 1, an example in which two auxiliary inductors Ls1 and Ls2 are configured and connected to the first auxiliary switch Ss1 and the second auxiliary switch Ss2, respectively, is illustrated. However, the present invention is not limited thereto and only a single auxiliary inductor may be implemented and an embodiment thereof will be described with reference to FIG. 2.

Figure 2:
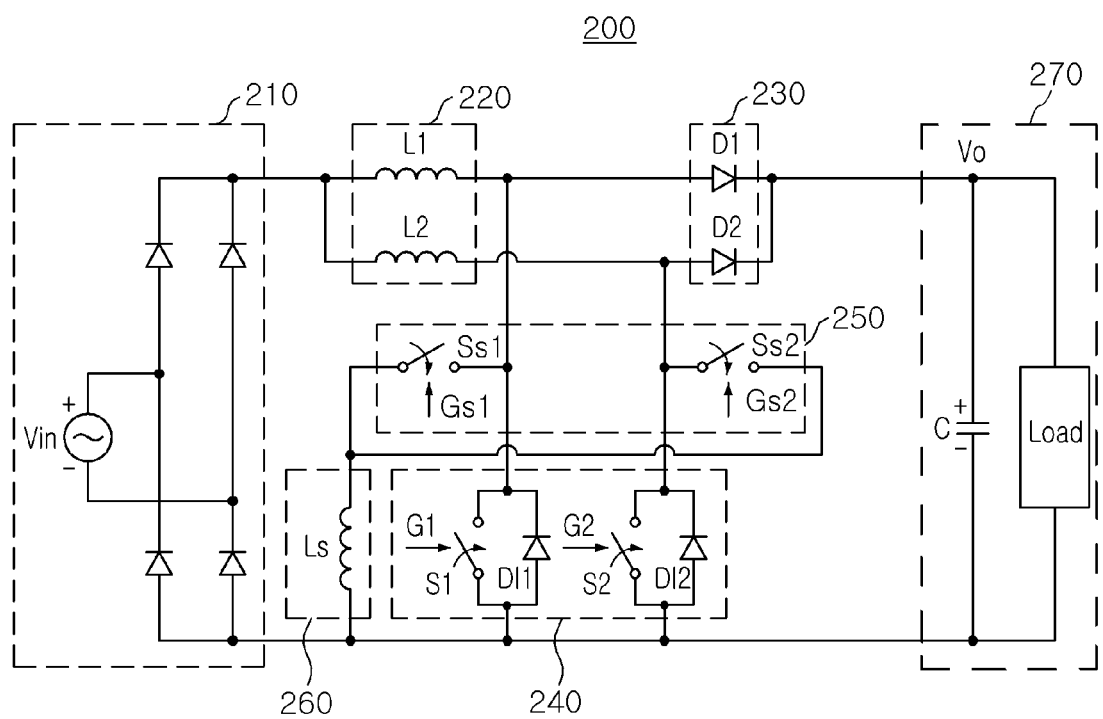
FIG. 2 is a schematic circuit diagram of a power factor correction circuit according to another embodiment of the present invention.

FIG. 2 is a schematic circuit diagram of a power factor correction circuit according to another embodiment of the present invention.

A power factor correction circuit 200 illustrated in FIG. 2 is the same as the power factor correction circuit 100 illustrated in FIG. 1, except for an auxiliary switching unit 250 and an auxiliary inductor unit 260, so a detailed description of the same configuration will be omitted.

The power factor correction circuit 200 illustrated in FIG. 2 may include one auxiliary inductor Ls and two auxiliary switches Ss1 and Ss2. In the illustrated example, since the single auxiliary inductor Ls is shared, a configuration of the circuit may be simplified. This may be configured because, power applied to the first and second inductors L1 and L2 has a relatively large capacity, so the first and second inductors L1 and L2 are required to be configured in an interleaved manner to guarantee stability of the circuit, while, in the case of the auxiliary inductor Ls, since relatively small power is applied thereto, even in the case that the auxiliary inductor Ls is used as a single element, it can operate stably.

Also, as mentioned above, the first main switch S1, the second main switch S2, the first auxiliary switch Ss1, and the second auxiliary switch Ss2 may be configured as one of an insulated gate bipolar transistor (IGBT), a metal oxide semiconductor field-effect transistor (MOS-FET), and a bipolar junction transistor (BJT), respectively.

Meanwhile, since the power factor correction circuits 100 and 200 illustrated in FIGS. 1 and 2 are implemented in a 2-phase interleaved manner, even in the case that a one-phase power factor correction element has an error, the other remaining one-phase power factor correction element may be used, having an advantage in that an output can be continuously supplied.

The power factor correction circuits 100 and 200 illustrated in FIGS. 1 and 2 may operate according to control signals provided by a control circuit 300 (to be described). A specific operation thereof will be described in detail with reference to FIGS. 3 through 6.

Figure 3:
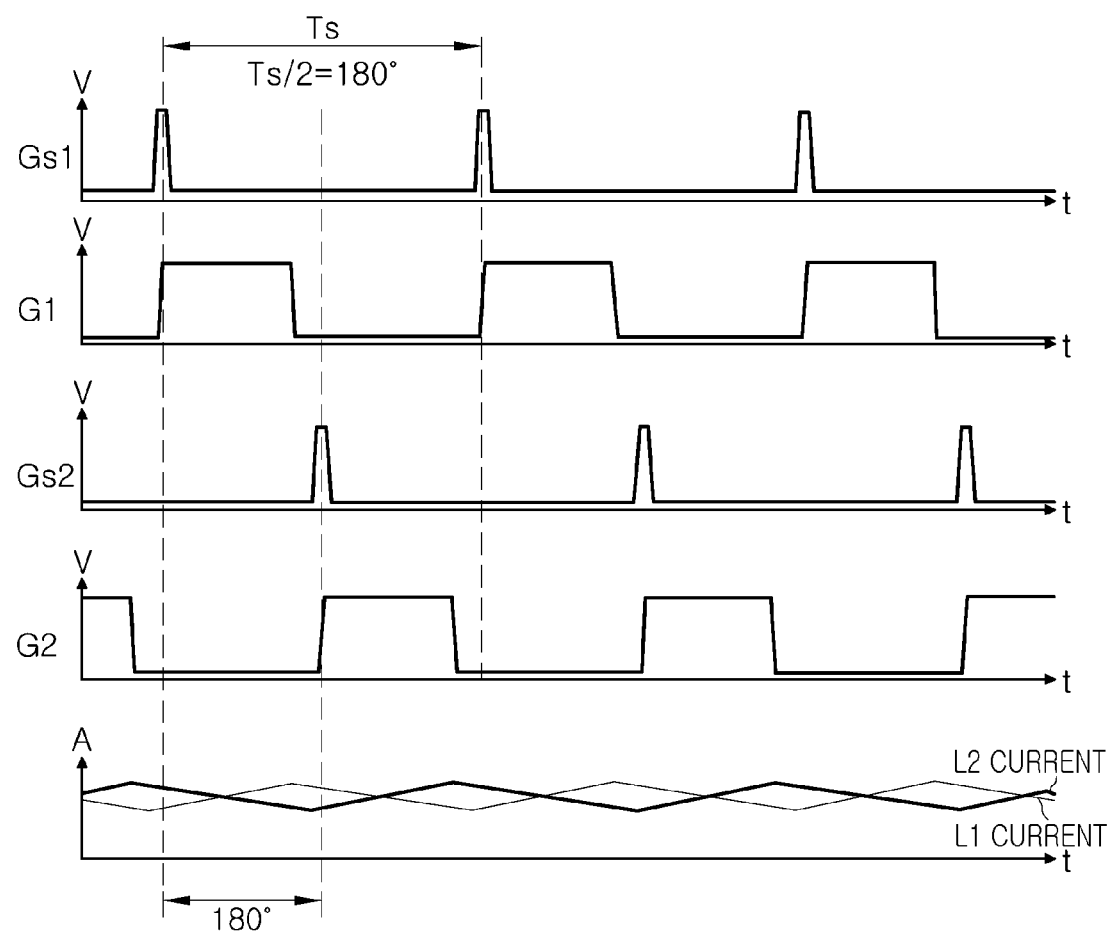
FIG. 3 is a reference graph showing examples of control signals of a main switch and an auxiliary switch employed in a power factor correction circuit according to an embodiment of the present invention.
Figure 4:
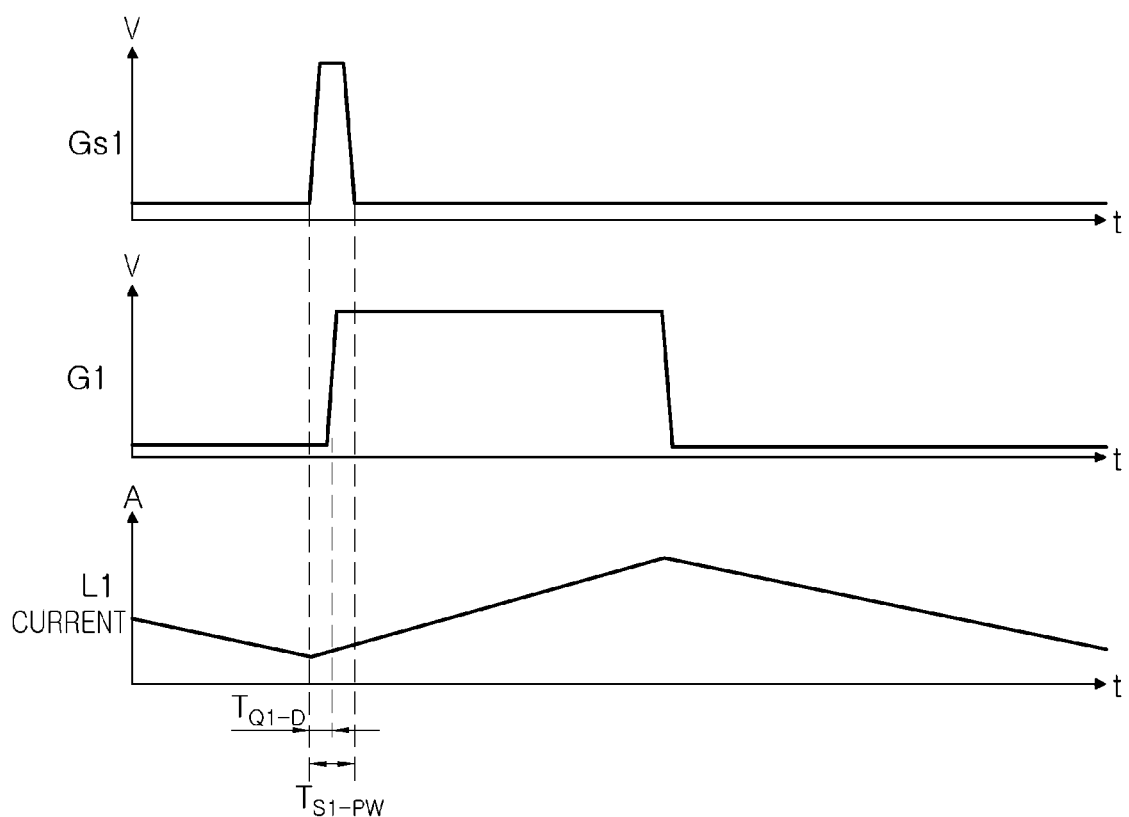
FIG. 4 is a partially enlarged view of the reference graph of FIG. 3.

FIG. 3 is a reference graph showing examples of control signals of a main switch and an auxiliary switch employed in a power factor correction circuit according to an embodiment of the present invention, and FIG. 4 is a partially enlarged view of the reference graph of FIG. 3.

Referring to FIGS. 1 through 4, the auxiliary switching unit 160 of the power factor correction circuit 100 may form a transmission path for surplus power before an operation of the main switch unit 140 (i.e., before the main switch unit 140 starts to operate). Namely, in other words, the auxiliary switching unit 160 may provide a zero voltage switching condition of the main switch unit 140 to remove switching loss.

In order to form the transmission path for surplus power, the auxiliary switching unit 160 may perform a switching operation in advance before a timing at which the main switch unit 140 performs a switching operation, and may complete the switching operation after the turn-on switching of the main switch unit 140 is completed. The main switch unit 140 and the auxiliary switching unit 160 may operate according to control signals provided by a control circuit 300 (to be described). For example, the control signals may be denoted by G1, G2, Gs1, and Gs2, and in this case, G1 and G2 may be control signals with respect to the first and second main switches S1 and S2, and Gs1 and Gs2 may be control signals with respect to the first and second auxiliary switches Ss1 and Ss2. When the control signals are high level signals (HIGH), the respective switches S1, S2, Ss1, and Ss2 may be turned on, and when the control signals are low level signals (LOW), the respective switches S1, S2, Ss1, and Ss2, may be turned off.

In detail, the first auxiliary switch Ss1 may form a transmission path for surplus power existing before an ON operation of the first main switch S1, and the second auxiliary switch Ss2 may form a transmission path for surplus power existing before an ON operation of the second main switch S2.

In FIG. 3, it can be seen that the control signals G1 and G2 of the first main switch S1 and the second main switch S2 have a 180-degree phase difference. This is an example of an operation in an ideal state, and it can be seen that a power factor correction has maximum efficiency when the phase difference is maintained to be 180 degrees.

Also, in FIG. 4, the first auxiliary switch Ss1 may be turned on before the first main switch S1 is turned on, and after the first main switch S1 is completely turned on, the first auxiliary switch Ss1 may be turned off. Also, the second auxiliary switch Ss2 is no different. Namely, in comparing the signal Gs1 with respect to the first auxiliary switch Ss1 and the signal G1 with respect to the first main switch S1, it can be seen that the signal Gs1 is changed to have a high level in advance at a time interval $T_{Q1-D}$ before the signal G1 is increased to have a high level. Similarly, the signal Gs1 may be changed from the high level to a low level while the signal G1 is in the high level state. Thus, it can be seen that a time interval $T_{S1-PW}$ during which the signal Gs1 is maintained to have a high level is greater than the time interval $T_{Q1-D}$.

In an example illustrated in FIGS. 3 and 4, the control signals have a 180-degree phase difference. Namely, in the example, it is illustrated that an L1 current of the first inductor L1 and an L2 current of the second inductor L2 have an ideal phase difference.

However, in an actual operation, the L1 current and the L2 current may have a phase difference other than 180 degrees, which will be described with reference to FIGS. 5 and 6 hereinafter.

Figure 5:
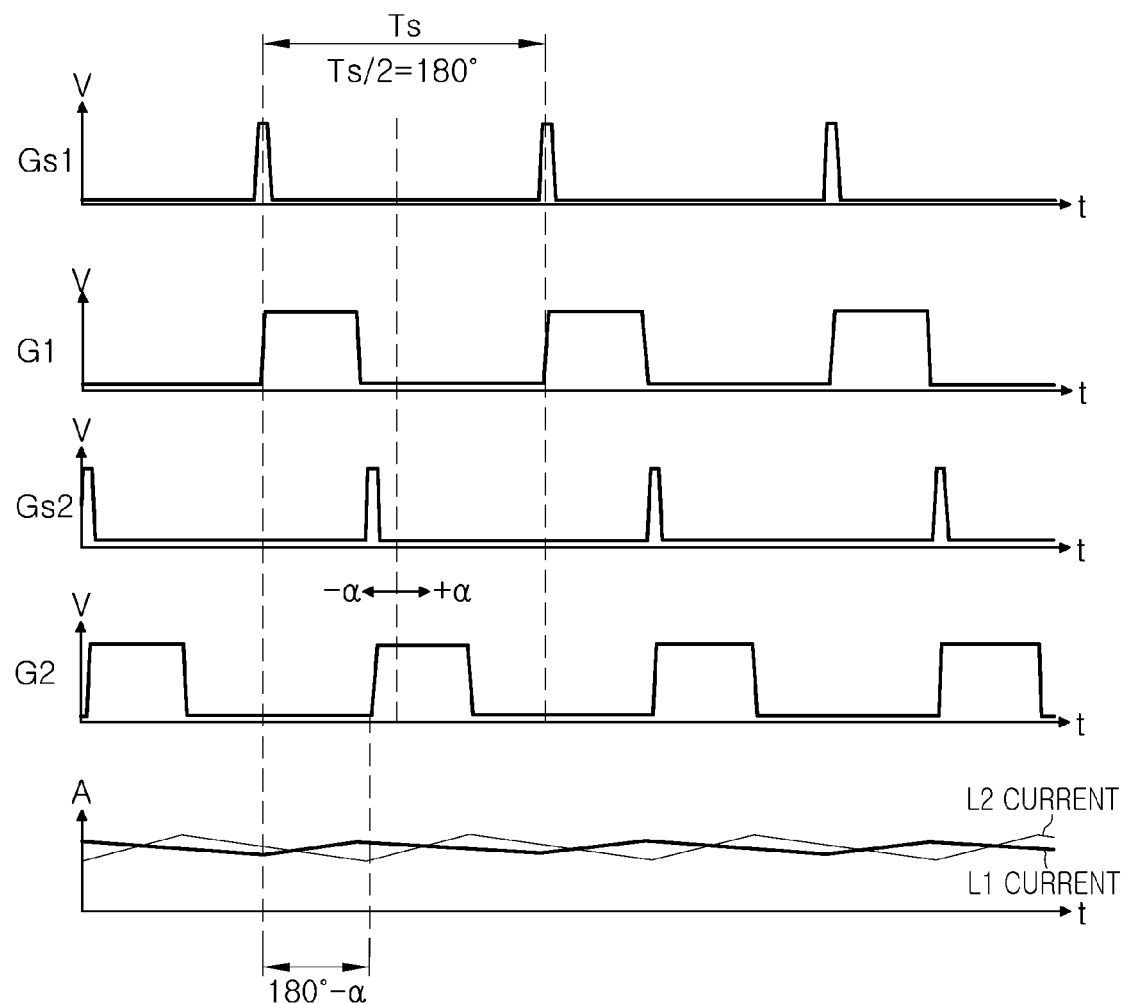
FIG. 5 is a reference graph showing other examples of control signals of a main switch and an auxiliary switch employed in a power factor correction circuit according to an embodiment of the present invention.
Figure 6:
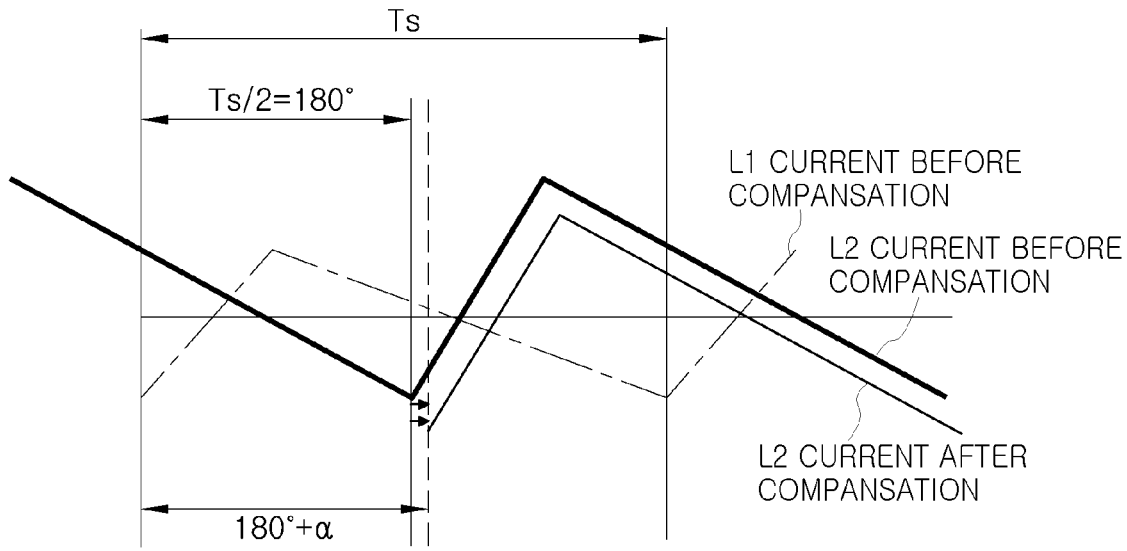
FIG. 6 is a reference graph showing imbalances of inductor currents of FIG. 5 and a phase delay for compensating for the imbalance.

FIG. 5 is a reference graph showing other examples of control signals of a main switch and an auxiliary switch employed in a power factor correction circuit according to an embodiment of the present invention, and FIG. 6 is a reference graph showing imbalances of inductor currents of FIG. 5 and a phase delay for compensating for the imbalance;

Referring to FIGS. 1, 2, and 5, it can be seen that control signals G1 and G2 have a phase difference, rather than 180 degrees. Namely, in the process of performing operations of the power factor correction circuits 100 and 200 in the present invention, the phases of the L1 current and the L2 current may be unbalanced. Here, balanced phases refer to the presence of a phase difference within 180 degrees, or within an error range (or an allowable limit of error, which is admitted as a normal range) based on 180 degrees, and unbalanced phases refer to a phase difference outside of the normal range.

In FIG. 5, when it is assumed that α is a delay or compensation angle outside of the normal range, it can be seen that the first inductor L1 and the second inductor L2 are currently in a compensation state. When there is the imbalance of the inductor currents, the compensation state makes the phase currents balanced by using the certain phase delay.

FIG. 6 illustrates an example of showing the imbalance compensation method by the interleaving phase delay. In the example of FIG. 6, it is assumed that the alternated long and short dashed line is the first inductor current (the L1 current) and the thick line is the second inductor current before compensation (180 degrees) (the L2 current). Finally, the regular line is the second inductor current after compensation (180+α degrees).

In an embodiment of the present invention, when the unbalanced phase condition takes place, the unbalance state is detected and corrected. In the example of FIG. 6, the phase angle of the L2 current is delayed to compensate for the unbalanced phase current with the L1 current.

Namely, the phase currents flowing in the inductor unit 120 are compared to detect whether or not they are unbalanced, and when the phase currents are unbalanced, the imbalance may be corrected by changing at least one phase angle of the first and second main switches S1 and S2.

Here, changing of the phase angle of the first or second main switch S1 or S2 may be performed by regulating a delay time of a control signal, and it may be performed by the control circuit.

Hereinafter, the control circuit will be described in detail with reference to FIGS. 7 and 8.

Figure 7:
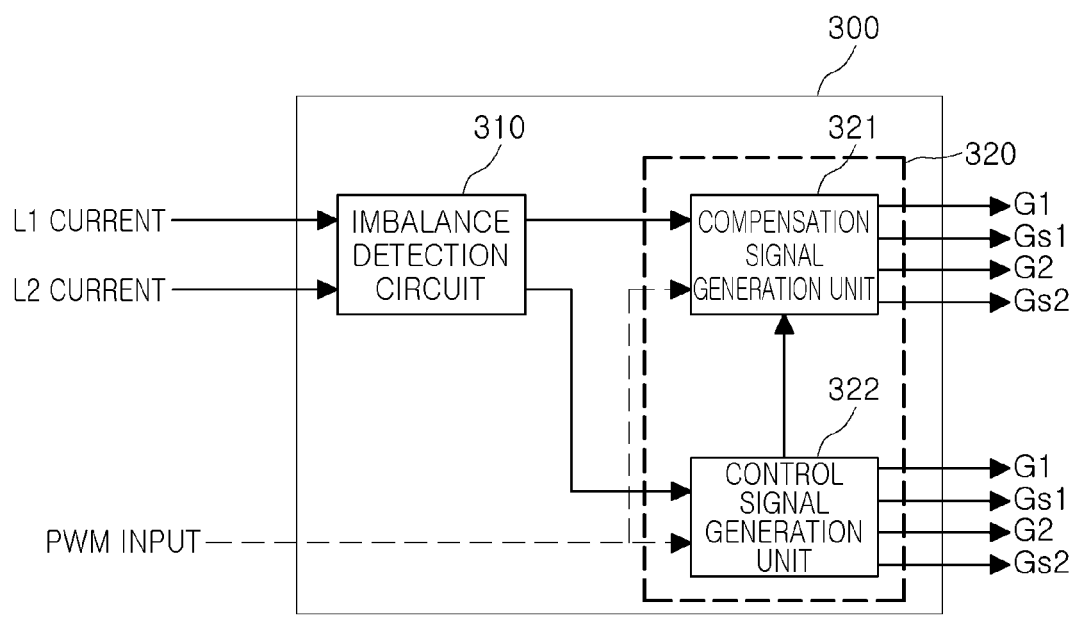
FIG. 7 is a block diagram of a control circuit according to an embodiment of the present invention.
Figure 8:
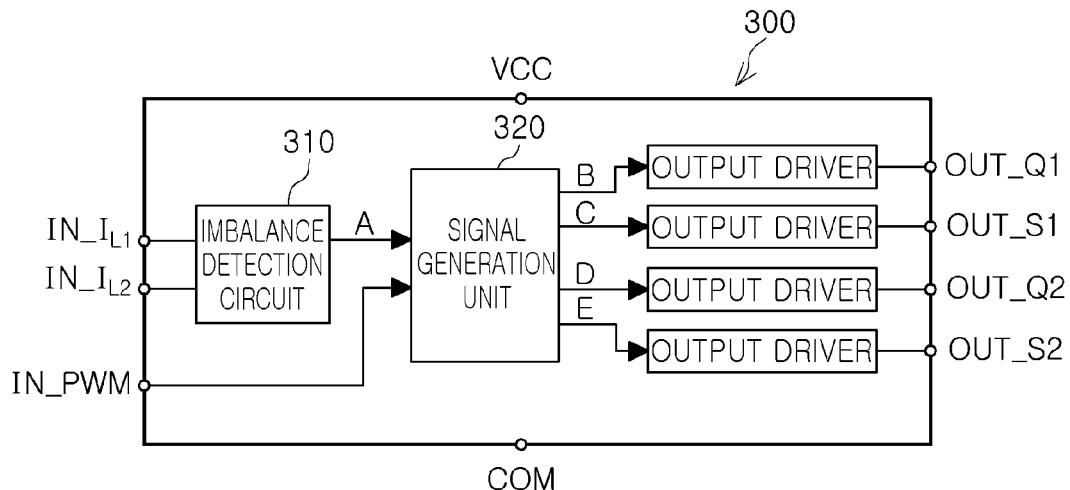
FIG. 8 is a block diagram illustrating an example of implementing the control circuit of FIG. 7 as an integrated circuit.

FIG. 7 is a block diagram of a control circuit according to an embodiment of the present invention, and FIG. 8 is a block diagram illustrating an example of implementing the control circuit of FIG. 7 as an integrated circuit.

Referring to FIGS. 1, 2, 7, and 8, the control circuit 300 may include imbalance detection unit 310 and a signal generation unit 320.

The imbalance detection unit 310 may detect whether the phase currents (the L1 and L2 currents) of the first and second inductors L1 and L2) are unbalanced.

In an embodiment, when the difference between the L1 current and the L2 current is within certain range, the imbalance detection unit 310 may determine that the phase currents are not unbalanced.

In another embodiment, the imbalance detection unit 310 may determine whether the phase currents are unbalanced based on the difference between the L1 current and the L2 current with certain range. The certain range may be determined as a pre-set value.

The signal generation unit 320 may generate the foregoing control signals. As mentioned above, the control signals may include the control signals G1 and G2 with respect to the first and second main switches S1 and S2 and the control signals Gs1 and Gs2 with respect to the first and second auxiliary switches Ss1 and Ss2.

In the embodiment illustrated in FIG. 7, the signal generation unit 320 may include a compensation signal generation unit 321 and a control signal generation unit 322.

The compensation signal generation unit 321 may generate and output a compensation signal, when it is determined that the phase currents are unbalanced by the imbalance detection unit 310. Namely, the compensation signal generation unit 321 may generate a control signal by changing at least one phase angle of the first and second main switches S1 and S2, in order to allow the L1 current and the L2 current to be balanced (namely, to reach a balanced state). Here, as mentioned above, changing of at least one phase angle of the first and second main switches S1 and S2 may be performed by reflecting a predetermined delay time in the control signal G1 or G2 of the first or second main switch S1 or S2.

In an embodiment, in generating the compensation signal to make phases balanced, the compensation signal generation unit 321 may delay at least one phase angle of the first and second main switches S1 and S2.

In the foregoing embodiment, the method of delaying a phase with respect to the compensation signal generation unit 321 has been described, but according to an embodiment, a phase of any one control signal may be advanced or a phase of at least one control signal may be delayed or advanced to balance phases.

When phases are balanced, the control signal generation unit 322 may generate and provide a control signal. The control signal generation unit 322 may generate a control signal to have a pre-set phase difference corresponding to a balanced state. For example, when it is assumed that a case of 180-degree phase difference is a balanced state, the control signal generation unit 322 may generate a control signal having a 180-degree phase difference.

FIG. 8 is a block diagram illustrating an example of implementing the control circuit of FIG. 7 as an integrated circuit. In FIG. 8, the signal generation unit 320 may be configured as a single block.

The imbalance detection unit 310 may receive the L1 current IN_$I_{L1}$ and the L2 current IN_$I_{L2}$, and when the L1 current and the L2 current are determined to be based on a phase current difference, the imbalance detection unit 310 may apply a high value to an imbalance signal A and provide the same to the signal generation unit 320.

Based on the imbalance signal A and a PWM signal IN_PWM applied to the signal generation unit 320, the signal generation unit 320 may provide signals B, C, D, and E to output drivers to allow the output drivers to generate control signals with respect to the plurality of switches (i.e., the first and second main switches and the first and second auxiliary switches), respectively.

When the imbalance signal A has a low level, the signal generation unit 320 may control the output drivers to maintain a current phase difference by reflecting the PWM signal IN_PWM.

Meanwhile, when the imbalance signal A has a high level, the signal generation unit 320 may control the output drivers to generate control signals by reflecting a phase change with respect to any one of the first and second main switches. In this case, when a phase delay with respect to a main switch occurs, a phase delay may also be generated in an auxiliary switch associated with the corresponding main switch in a similar manner. This is because an ON timing of the auxiliary switch is determined based on an ON timing of the main switch.

The output drivers may generate signals to be provided to respective switches according to signals generated by the signal generation unit 320.

Figure 9:
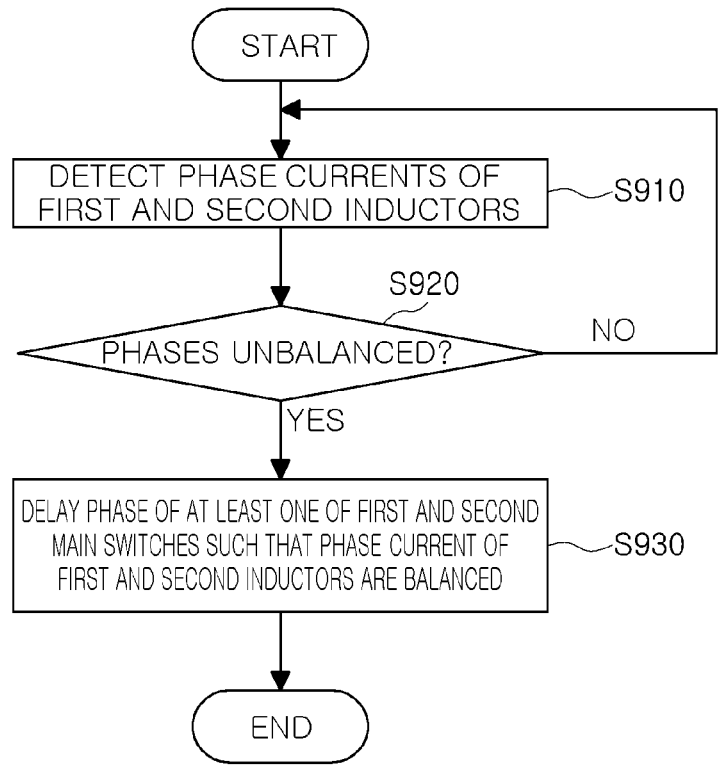
FIG. 9 is a flow chart illustrating a method for controlling power factor correction according to an embodiment of the present invention.

FIG. 9 is a flow chart illustrating a method for controlling power factor correction according to an embodiment of the present invention.

Hereinafter, an embodiment of a method for controlling power factor correction according to an embodiment of the present invention will be described. An embodiment of a method for controlling power factor correction according to an embodiment of the present invention is based on the power factor correction circuits 100 and 200 and the control circuit 300 described above with reference to FIGS. 1 through 8, so the same description as or equivalent content to the foregoing description will be omitted.

Referring to FIGS. 1, 2, and 9, the control circuit 300 may detect phase inductor currents (L1 current and L2 current) flowing in the first and second inductors L1 and L2 (S910).

The control circuit 300 may compare the phase currents of the first and second inductors (L1 current and L2 current) to determine whether they are unbalanced (S920). When the phase currents of the first and second inductors (L1 current and L2 current) are unbalanced (YES in operation S920), the control circuit 300 may delay a phase of at least one of the first and second main switches S1 and S2 such that the phase currents of the first and second inductors are balanced (S930).

In operation S920, when the difference between the first and second inductor currents is within certain range, the control circuit 300 may determine that the phases are not unbalanced.

In operation S930, when the difference between the first and second inductor currents is above certain range, the control circuit 300 may delay a phase of any one of the first and second inductor currents to compensate the difference of the phase currents. Namely, the control circuit 300 may provide a control signal having a delayed phase to any one of the first and second main switches S1 and S2 with respect to the first and second inductors L1 and L2.

In an embodiment of the present invention, the method for controlling power factor correction may further include performing process when phases are balanced. For example, when phases are balanced, the control signal having a pre-set phase difference applied in a balanced state.

As set forth above, according to embodiments of the invention, imbalances of phase inductor currents are detected, and the phases of the respective inductors are individually controlled to thus compensate for the imbalance of the phase inductor currents.

While the present invention has been shown and described in connection with the embodiments, it will be apparent to those skilled in the art that modifications and variations can be made without departing from the spirit and scope of the invention as defined by the appended claims.

What is claimed is:

1. A power factor correction device comprising:
   a power factor correction circuit including first and second inductors connected to an input power source stage and first and second main switches performing a switching operation on the first and second inductors, respectively; and
   a control circuit providing control signals to the first and second main switches, respectively, and changing a phase of at least one of the first and second main switches to correct an imbalance of phase currents flowing in the respective first and second inductor when the phases are unbalanced,
   wherein the power factor correction circuit comprises:
      first and second inductors having one ends connected to the input power source stage and the other ends connected to a load stage, the first and second inductors being connected to each other in parallel;
      first and second main switches switching the first and second inductors to have a phase difference, according to the control signal provided by the control circuit; and
      first and second auxiliary switches forming a transmission path for surplus power existing in the circuit before the first and second main switches are turned on.

2. The power factor correction device of claim 1, wherein the control circuit comprises:
   an imbalance detection unit detecting whether the phase currents of the first and second inductors are unbalanced; and
   a compensation signal generation unit generating a control signal by delaying a phase of at least one of the first and second main switches to make the phase currents of the first and second inductors balanced, when the phases are unbalanced.

3. The power factor correction device of claim 2, wherein the control circuit further comprises a control signal generation unit generating the control signal to have a pre-set phase difference when the phases are not unbalanced.

4. The power factor correction device of claim 1, wherein when the difference between the first and second inductor currents is within certain range, the control circuit determines that the phases of the first and second inductors are not unbalanced.

5. The power factor correction device of claim 1, wherein the first and second inductors accumulate or discharge power provided by the input power source stage according to switching operations of the first and second main switches, respectively.

6. The power factor correction device of claim 1, wherein the power factor correction circuit further comprises:
   first and second auxiliary inductors connected to the first and second auxiliary switches and accumulating or discharging the surplus power according to a switching operation of the first and second auxiliary switches.

7. The power factor correction device of claim 1, wherein the first and second auxiliary switches perform a switching operation in advance before the first and second main switches perform a switching operation, and complete the switching operation after the turn-on switching of the first and second main switches is completed, respectively.

8. The power factor correction device of claim 1, wherein the power factor correction circuit further comprises:
   first and second reverse current preventing diodes connected in parallel to the first and second main switches and preventing reverse currents in the first and second main switches, respectively.

9. The power factor correction device of claim 1, wherein the power factor correction circuit further comprises:
   a first diode providing a transmission path for power discharged from the first inductor according to a switching operation of the first main switch; and
   a second diode providing a transmission path for power discharged from the second inductor according to a switching operation of the second main switch.

* * * * *